Feb. 20, 1940.                H. T. WHEELER                 2,191,265
                    SEGMENTAL METALLIC PACKING RING
                         Filed June 6, 1936            2 Sheets-Sheet 1
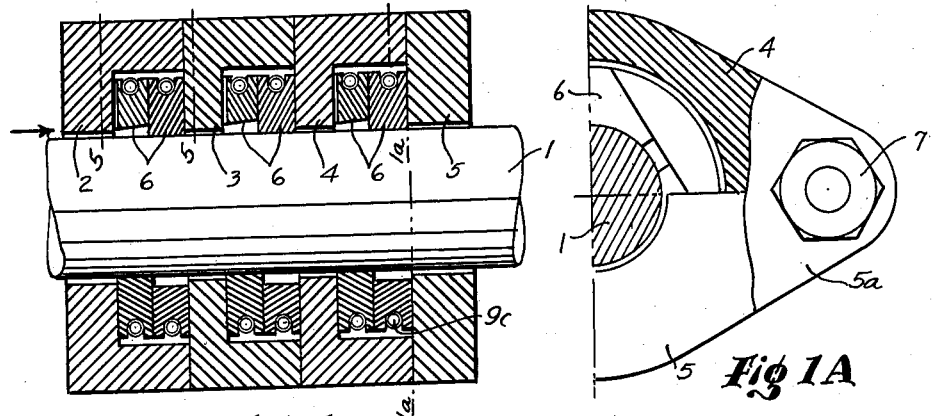
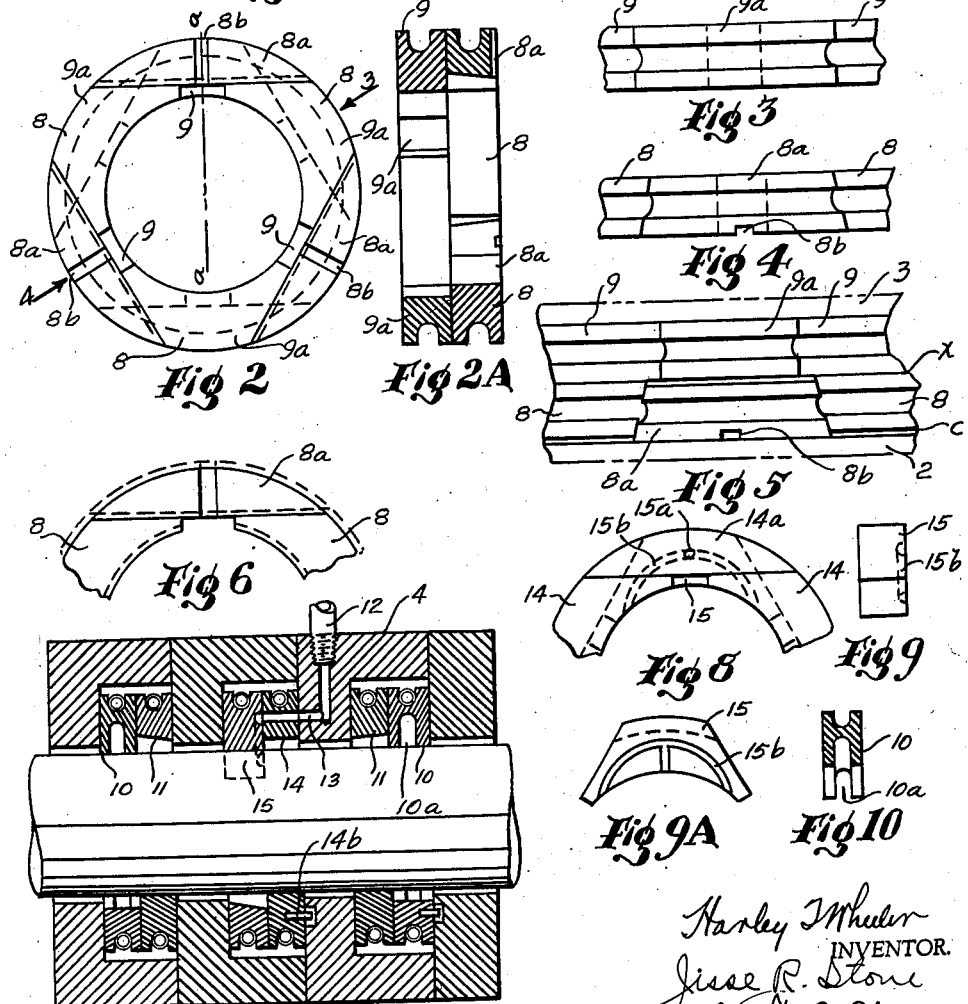

Feb. 20, 1940. H. T. WHEELER 2,191,265
SEGMENTAL METALLIC PACKING RING
Filed June 6, 1936 2 Sheets-Sheet 2
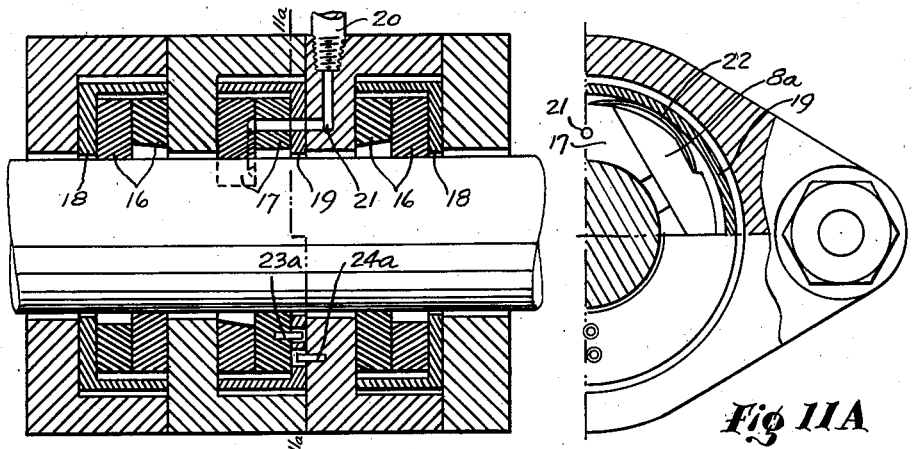
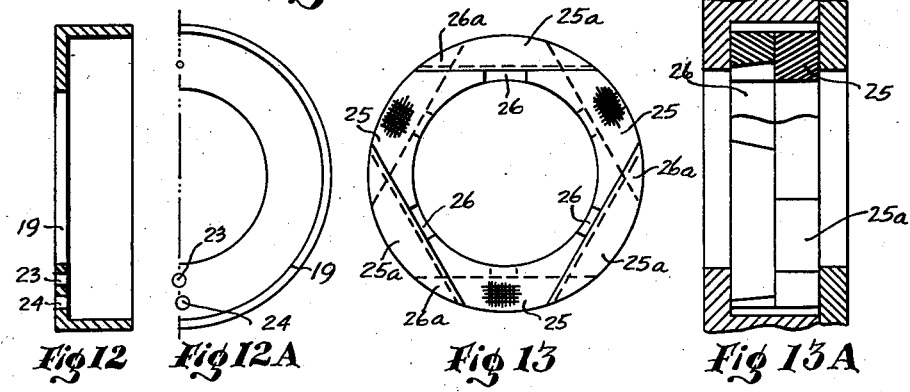
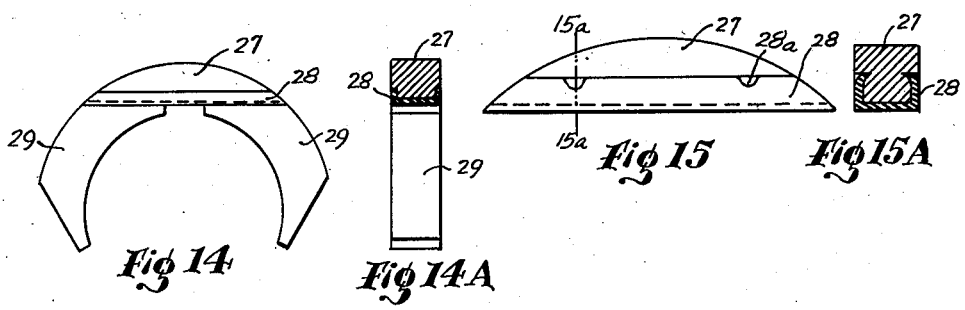
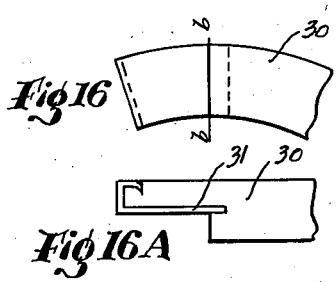
Harley T Wheeler
Jesse R. Stone
Lester B. Clark
INVENTOR.
BY
ATTORNEYS Patented Feb. 20, 1940

2,191,265

UNITED STATES PATENT OFFICE 2,191,265

SEGMENTAL METALLIC PACKING RING

Harley T. Wheeler, Dallas, Tex.

Application June 6, 1936, Serial No. 83,874

7 Claims. (Cl. 286—22)

My invention relates to metallic packing rings to be employed in a stuffing box about a moving rod or shaft. It is designed particularly to use either where the packing is subjected to heat or to corrosive gases.

It is an object of the invention to provide a metallic packing ring which is flexible so as to maintain a seal about a moving rod wherein a certain amount of lateral vibration or sway is present. I desire to provide such a packing wherein the sealing means is automatically adjustable to make close sealing contact with the rod while the rod is moving.

I aim to produce a ring composed of a plurality of segments, some of which are longitudinally tapered to give a wedging action in moving the segments into sealing position.

It is a further object to provide ring segments which have a limited amount of resiliency longitudinally of the box to aid in preserving a seal. I employ two complementary sealing rings which together serve to close off the passage of hot gases.

It is a further object of the invention to provide means for lubricating the upper portion of the rod by conducting the lubricant through the packing rings during their operation.

It is a further object to provide a packing unit which may be used in multiple stage arrangement, each unit being housed within a separate outer ring or housing.

It is a further object to adapt the ring construction for the use of materials other than metal, particularly where corrosive fluids are to be packed off. I desire to so construct the ring segments of corrosion resisting materials that they will not wear materially in use and serve as a packing where segments of metal are not particularly effective.

Referring to the drawings herewith, Fig. 1 is a central longitudinal section through a stuffing box installation shown as mounted upon a rod.

Fig. 1a is a broken end view of the stuffing box showing the arrangement of the packing rings therein.

Fig. 2 is an end elevation of one of the packing units consisting of two adjacent rings.

Fig. 2a is a central longitudinal section on the line a—a of Fig. 2.

Fig. 3 is a broken side view showing one of the segments in one of the two rings.

Fig. 4 is a similar view of one of the segments in the adjacent ring.

Fig. 5 is a similar broken side view illustrating the position of the two segments side by side.

Fig. 6 is a broken end view illustrating the manner in which the ring may expand.

Fig. 7 is a central longitudinal section through a stuffing box installation showing the manner of lubricating the same.

Fig. 8 is a broken end view of one of the rings showing the arrangement of the lubricating passages.

Fig. 9 is a side view thereof.

Fig. 9a is an end view of one of these segments having the oil grooves therein.

Fig. 10 is a transverse section of one of the segments the interior of which has been channeled as shown in Fig. 7.

Fig. 11 is a central longitudinal section through a stuffing box installation showing a slightly different arrangement of the sealing rings.

Fig. 11a is a broken end view of the stuffing box shown in Fig. 11.

Fig. 12 is a transverse section through one of the cups or housings for the sealing rings.

Fig. 12a is a broken end view of the said cup shown in Fig. 12.

Fig. 13 is an end view of a sealing ring constructed partly of a fabric composition.

Fig. 13a is a broken view illustrating a cross section of a packing unit having rings such as shown in Fig. 13.

Fig. 14 is an end view showing the arrangement of the cap plate for installations employing a fabric composition.

Fig. 14a is a vertical section through the assembly shown in Fig. 14.

Fig. 15 is an end view of a slightly different embodiment of the cap plate.

Fig. 15a is a transverse section on the plane 15a—15a of Fig. 15.

Fig. 16 is a broken end view of a composition ring having a metal facing thereon.

Fig. 16a is a side view of the structure shown in Fig. 16.

Fig. 16b is a transverse section on the line b—b of Fig. 16.

The invention consists particularly in the construction of a packing unit in segmental ring packing such as is ordinarily employed in stuffing boxes to pack about a moving shaft or rod having a certain amount of lateral movement and also which is adapted for use on rods of unequal diameter throughout the length of the rod. To accommodate conditions such as these it is necessary that the ring be made of segments flexibly connected together so that they may move and adapt themselves to the movements of the rod.

In Fig. 1 I have illustrated an installation such as may be employed in a stuffing box about a a moving shaft. The installation includes three separate units such as here shown, it being understood that as many units will be employed as may be necessary in the particular construction in which the stuffing box is used. The three units each comprise a cup member indicated in Fig. 1 by the numerals 2, 3 and 4. These cup members have an interior diameter slightly larger than the shaft and are recessed on the side away from the pressure to receive two separate segmental rings, indicated at 6 in Fig. 1. At the outer end of the box is a plate 5 which, as shown in Fig. 1a, may be clamped in position by an outer cap or gland 5a by means of through bolts and nuts 7.

Considering one of the sets of packing rings, it is to be noted that one of the rings on the side toward the pressure is constructed slightly different from the adjacent ring. In Figs. 2 and 2a the ring toward the pressure is made up of three segments 8 set in uniform spaced relation upon the rod and having the ends of the segments cut on a line which is approximately tangent to the circle of the shaft and spaced slightly from the shaft, as will be seen in Fig. 2. There is thus provided a seat on the adjacent ends of each of the segments for a cap plate 8a. This seat upon which the cap plate fits is beveled or inclinded as will be understood from the dotted lines in Fig. 2. The bevel on the seat interfits with the cap plate 8a so that the larger end of the said cap plate is presented away from the source of pressure. It is also to be noted that when pressure is exerted against the outer circumference of the cap plate there will be a tendency of said plate to slide longitudinally relative to the adjacent segments 8. This will be understood from Figs. 4 and 5.

Fig. 4 is taken in the direction of the arrow 4 in Fig. 2 and it will be seen that when the ring is in normal position the cap will be in direct alignment with the adjacent segments 8. However, in Fig. 5, the cap plate 8a is shown as being under pressure around the circumference in such manner as to tend to wedge the section 8a laterally against the wall of the section 2. This gives the ring a certain resiliency so that when the pressure is exerted around the circumference of the ring the cap plates will be moved against the adjacent wall and tend to wedge the ring in the opposite direction against the adjacent ring and thus form a seal along the surface indicated at X. There is a slight clearance between the ring 8 and the wall 2, which is indicated at c, into which pressure fluid may find entrance, thus exerting a lateral pressure against the adjacent ring and the wall 3 at the other side of the unit.

It is to be noted especially from Fig. 2a that the crcumference of each segment is deeply grooved as there indicated to receive garter springs shown at 9c in Fig. 1. These springs hold the segments inwardly against the shaft but allow a flexibility which will be obvious.

One one end of each of the cap plates 8a is a radially extending groove 8b shown in Figs. 2, 4 and 5. These openings form a radial passage through which pressure fluid tending to escape along the rod may find an exit outwardly into the chamber in which the two rings are housed. This allows the pressure of the fluid to be exerted against the outer circumference of each of the rings and will thus assist in maintaining a seal at the rod in each installation.

The adjacent ring is made up of similar segments and is constructed in all respects similar to the ring having the segments 8 but the cap plates have no taper or bevel relative to the other segments and hence have no wedging action. It cooperates with the adjacent ring, however, in that a wedging action of the cap plates on the ring first described will force the two rings together and will force the ring 9 against the wall of the adjacent cup and preserve a seal through which fluid cannot escape to any material extent. It is to be understood that fluid tending to escape along the rod in Fig. 1 will be sealed off from passing to the adjacent packing unit to a large extent. Such gases as do escape, however, past the first unit will be sealed in the second unit in the same manner as in the first and the action of the third unit will be to cut down the escape of gases so that a tight seal is obtained. It is to be understood that this type of packing installation finds its greatest use on reciprocating engines and particularly of the internal combustion type and that the pressure packed against is hence a pulsating pressure which lasts but a short interval of time and then has a reverse stroke tending to reverse the action. This type of packing is particularly adapted for such uses. In Fig. 6 the manner in which the segments may expand or contract relative to each other is indicated by the dotted and full line positions of the parts.

In packing of this kind the lubricating of the shaft is often a feature of importance and in Fig. 7 I have indicated how lubricant may be supplied to the upper side of the shaft through the packing installation previously described. Thus lubricant may be forced through a pipe 12 connected with one of the cup members 4. There is a fluid passage in the cup member shown at 13, which delivers lubricant through an opening in segment 14 of one of the rings 8 against the side of the adjacent ring 15. With reference to Figs. 8 to 9a, inclusive, it will be seen that the face of the segment 15 is formed with oil grooves 15b therein to which the lubricant is fed through opening 15a in the segment 14a, and thus discharged downwardly against the upper side of the shaft. It is to be understood that the rings are held against rotative movement relative to the cups or the shaft by means of dowels 14b in the rings engaging within openings in the adjacent wall of the cup 4, thus preventing the openings in the rings from getting out of alignment with the oil system.

In Figs. 7 and 10 I have shown how the interior of one of the rings may be grooved on its interior so as to make the same more resilient longitudinally. Thus the segment 10 of one of the rings 9 is formed with an interior groove 10a which extends into the ring from the surface adjacent the shaft and provides a space between the ends of the ring which allows a certain amount of compression of the ring itself, making it more resilient.

In Figs. 11 and 12, I have shown how the packing assembly may be housed in a floating cup 18 which in turn is housed within a larger cup-shaped member, such as has been previously described. The inner floating cup 18 furnishes a housing for the packing unit 16, which itself is somewhat loosely mounted within the floating cup. The action of the packing members in this installation is approximately the same as in the previous installation except that the adjustability of the packing unit is somewhat improved through the fact that the cup 18 allows a material amount of vibration relative to the chamber in which it is situated, thus tending to increase the flexibility of the packing. In this structure it is possible to lubricate the shaft through a lubricating pipe 20 discharging lubricant through the passage 21 and through the wall of the cup 19 into the packing assembly as in the previous embodiment. The rings and the cup are held against rotation relative to the shaft by dowels 23a and 24a as will be obvious.

If desired it is possible to hold the segments of the ring together by a plurality of springs arranged within the floating cups 18 or 19. This will be seen from Fig. 11a where a leaf spring 22 is arranged between the cap plate 8a and the wall of the cup 19, the opposite end of the spring bearing against the segment 17. When the segmental rings are arranged within the cup 19, as there shown, the springs 22 will serve the same purpose as the garter springs illustrated in the previous embodiment and will have the same sealing effect.

In Fig. 13 I have shown an arrangement whereby the segmental sections 25 of the packing ring may be made up of composition, which may, for example, be composed of layers of fabric impregnated with phenol formaldehyde composition which is vulcanized into laminated layers of fabric which may be, for example, cotton or linen. When thus formed these ring segments will be resistant to the destructive effects of gasoline, sulphur and other corrosive impurities in the fluid.

In the use of composition segments such as have been described it is found that where a ring is made up entirely of such composition the adjacent edges in contact with each other tend to wear to such an extent that a seal is almost impossible. I therefore employ cap plates 25a of metal engaging with the ends of the composition segments. In this manner none of the composition segments contact with each other and the wear which would otherwise take place is eliminated. However, the sealing surface contacting with the shaft is entirely of the composition. The ring 26 on the downstream side in Fig. 13a is entirely of metal while the ring on the pressure side may be made with segments of composition as above described. Thus as the housing cups 2, 3 and 4 are of metal, the segments of the pressure ring will engage only with metal, both on its sides and ends and efficient service from such rings will be obtained.

If the segments and cup plates are made of the fabric composition the contacting faces of the segments should be metal faced so that the composition segments will not come in contact with each other. In Figs. 14 and 14a I have shown the cap plate 27 as being faced with a metal covering 28 on the side adjacent the segments 29. Thus the portion 27 may be also made of composition, the metal facing 28 on the side adjacent the segments serving to prevent contact in use with the composition segments. In Figs. 15 and 15a another embodiment of the facing material is shown. In this embodiment the metal facing is formed in a channel-shaped metal facing fitting over the inner side of the cap plate 27. This facing is secured in position by indenting the sheet metal at its outer margin, as shown at 28a. The facing thus secured to the segmental cap plate prevents contact of the composition segments with the plates and thus provides a ring which will wear for long periods of time and resist the action of corrosive liquid and gases.

In Figs. 16, 16a and 16b I have shown how a composition piston ring may be provided with a metal shoe at the engaging ends of the segments. The part of one ring 30 which overlaps the end of the adjacent ring is faced with a metal facing 31 which is extended around the reduced end of the segment and pressed into the outer end of the ring in such manner as to hold the same rigidly in position. By facing the segments of sectional rings in this manner it is possible to employ composition materials where otherwise metal would necessarily have to be employed.

It will be understood that the installation of segmental rings thus described will provide a flexible packing means which will resist the action of heat, acids, and the like and will wear for long periods of time. It will thus preserve a seal around a moving rod or shaft even where the said rod is not of uniform diameter and where there is a certain amount of lateral vibration or sway to the rod. The flexible nature of the packing rings will accommodate the variations in the packing surface and form a seal under conditions where ordinary packing would be ineffective. By lubricating the packing I am enabled not only to assist in the sealing effect of the rings but also to prevent undue wear along the shaft. This is a feature of importance in many installations.

It is to be understood that my invention is capable of general application and is not restricted entirely to the specific construction hereinbefore described.

What is claimed as new is:

1. A packing unit including two segmental rings, each ring including a plurality of segments the adjacent ends of said segments being cut on a secant of a circle to form a seat, a cap plate on each seat thus completing the circle of the ring, means to hold said segments resiliently together, said cap plates on one of said rings being tapered longitudinally on the straight side thereof contacting with said seat.

2. A packing unit including a plurality of cup sections enclosing chambers about a rod, a pair of rings loosely mounted in each chamber, each ring being made up of a plurality of arcuate segments, the adjacent ends of which are in alignment to form a seat, a cap plate on said seat, said plate on one of said rings being tapered longitudinally on the side adjacent said seat, said plate being grooved radially to permit passage of pressure fluid into said chamber, and means to hold said ring in position about said rod.

3. A packing unit including a plurality of cup sections enclosing chambers about a rod, a pair of rings loosely mounted in each chamber, each ring being made up of a plurality of arcuate segments, the adjacent ends of which are in alignment to form a seat, a cap plate on said seat, said seat and plate on one of said rings being inclined longitudinally, means to exert an inward pressure on said plates and move them longitudinally in said chamber for the purpose stated.

4. A packing unit including a plurality of cup sections enclosing chambers about a rod, a pair of rings loosely mounted in each chamber, each ring being made up of a plurality of arcuate segments, the adjacent ends of which are in alignment to form a seat, a cap plate on said seat, said seat on one ring being inclined relative to the axis of said rod and a spring to hold said plates and segments on said rod, said plates being grooved radially to permit pressure fluid to pass into said chamber about said rings.

5. A packing unit for stuffing boxes including an annular floating cup adapted to fit about a rod, a plurality of packing rings in said cup, said rings being each made up of a plurality of segmental sections spaced slightly apart, a cap plate engaging the adjacent ends of said sections and acting with said sections to form a ring, means between said cup and said ring to hold said ring against said rod, the cap plates on one of said rings being tapered to be moved longitudinally under radial pressure, to wedge said rings together in said cup, means to lubricate said rings, and means to prevent said rings from rotation in said cup.

6. A rod packing unit, including a pair of sectional rings, means to hold said rings in position upon the rod, a housing for said rings, means to introduce lubricant through the wall of said housing, and through one of said rings, and a groove in the other of said rings to conduct said lubricant to said rod.

7. A rod packing unit, including a pair of sectional rings, means to hold said rings in position upon the rod, a housing for said rings, means to introduce lubricant through the wall of said housing, and through one of said rings, and a groove in the other of said rings to conduct said lubricant to said rod between said rings, and means to prevent rotation of said rings on said rod thus maintaining said lubricating means properly positioned.

HARLEY T. WHEELER.